(12) United States Patent
Ichikawa et al.

(10) Patent No.: US 11,565,741 B2
(45) Date of Patent: Jan. 31, 2023

(54) ELECTRIC POWER STEERING DEVICE

(71) Applicant: Mitsubishi Electric Corporation, Tokyo (JP)

(72) Inventors: Takanori Ichikawa, Tokyo (JP); Satoshi Iohara, Tokyo (JP); Akira Kimishima, Tokyo (JP); Takahisa Kawaguchi, Tokyo (JP); Kentaro Urimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 316 days.

(21) Appl. No.: 16/641,382

(22) PCT Filed: Oct. 13, 2017

(86) PCT No.: PCT/JP2017/037182
§ 371 (c)(1),
(2) Date: Feb. 24, 2020

(87) PCT Pub. No.: WO2019/073594
PCT Pub. Date: Apr. 18, 2019

(65) Prior Publication Data
US 2021/0362771 A1 Nov. 25, 2021

(51) Int. Cl.
*B62D 5/00* (2006.01)
*B62D 5/04* (2006.01)
(Continued)

(52) U.S. Cl.
CPC ........... *B62D 5/046* (2013.01); *B62D 5/0406* (2013.01); *H02K 9/227* (2021.01); *H02K 11/33* (2016.01); *G01L 3/04* (2013.01)

(58) Field of Classification Search
CPC ...... B62D 5/046; B62D 5/0406; H02K 9/227; H02K 11/33; G01L 3/04
See application file for complete search history.

(56) References Cited

U.S. PATENT DOCUMENTS

| 2011/0018374 A1* | 1/2011 | Yamasaki | H01L 25/11 310/68 B |
| 2011/0290580 A1* | 12/2011 | Mukai | B62D 5/04 180/443 |

(Continued)

FOREIGN PATENT DOCUMENTS

| JP | 5435284 B2 | 3/2014 |
| JP | 2016-163414 A | 9/2016 |

(Continued)

OTHER PUBLICATIONS

International Search Report for PCT/JP2017/037182 dated Nov. 28, 2017 (PCT/ISA/210).

*Primary Examiner* — Rina I Duda
(74) *Attorney, Agent, or Firm* — Sughrue Mion, PLLC; Richard C. Turner

(57) ABSTRACT

In an electric power steering, a control unit includes a first power module configured to supply current to first motor windings, a first control board configured to output a control signal to the first power module, a second power module configured to supply current to second motor windings, a second control board configured to output a control signal to the second power module, and a heat sink. The heat sink includes a column portion having a plurality of mounting portions defined by flat surfaces parallel to the axial direction of the output shaft. The first control board and the second control board are each mounted along a corresponding one of one pair of opposing mounting portions, and the first power module and the second power module are each mounted along a corresponding one of another pair of opposing mounting portions.

10 Claims, 7 Drawing Sheets

(51) Int. Cl.
    *H02K 11/33*     (2016.01)
    *H02K 9/22*     (2006.01)
    *G01L 3/04*     (2006.01)

(56) References Cited

U.S. PATENT DOCUMENTS

| | | | |
|---|---|---|---|
| 2014/0326530 A1* | 11/2014 | Asao | B62D 5/0403 |
| | | | 180/443 |
| 2015/0084570 A1* | 3/2015 | Hara | H02P 29/68 |
| | | | 318/494 |
| 2016/0094175 A1* | 3/2016 | Yamasaki | H02K 11/33 |
| | | | 318/724 |
| 2016/0254732 A1 | 9/2016 | Kojima et al. | |
| 2017/0217481 A1 | 8/2017 | Asao et al. | |

FOREIGN PATENT DOCUMENTS

| | | |
|---|---|---|
| JP | 2017-159768 A | 9/2017 |
| WO | 2016/063367 A1 | 4/2016 |
| WO | 2017/154501 A1 | 9/2017 |
| WO | 2017/175325 A1 | 10/2017 |

\* cited by examiner

ELECTRIC POWER STEERING DEVICE

CROSS REFERENCE TO RELATED APPLICATIONS

This application is a National Stage of International Application No. PCT/JP2017/037182 filed Oct. 13, 2017.

TECHNICAL FIELD

The present invention relates to an electric power steering device including a motor and a control unit integrated with each other, and more particularly, to a structure of a control unit including two motor drive circuits.

BACKGROUND ART

In related-art driving devices, a motor and a control unit are arranged coaxially in an axial direction of an output shaft of the motor, and are integrated with each other. Some of the related-art driving devices have such a structure that, for example, a stator and a rotor are incorporated in a motor case, and main components of the control unit provided near the motor are stacked on one another in the axial direction for assembly. There has appeared another related-art device that includes two sets of motor windings in consideration of redundancy, and thus includes two independent, so-called inverter circuits for driving those motor windings, and two independent control boards (see, for example, Patent Literature 1).

CITATION LIST

Patent Literature

[PTL 1] JP 2017-159768 A

SUMMARY OF INVENTION

Technical Problem

The related-art devices disclosed in Patent Literature 1 have the structure in which a motor is integrated with a control unit provided at an end portion of the motor on an opposite side to an output side of the output shaft of the motor. In consideration of mounting of the related-art device configured as described above to a vehicle, when a control unit is larger in a radial direction of a motor, it becomes difficult to install the device to the vehicle in many cases due to restrictions on mounting to the vehicle. In contrast, the related-art device can have a relatively larger length in the output shaft direction of the motor in many cases. In view of the above, the control unit is required to have an area in the radial direction that is equivalent to or smaller than that of the motor in consideration of mounting of the related-art device to the vehicle. To that end, in related-art devices, a power module and a heat sink as components of a control unit are provided in parallel to an axial direction of an output shaft, that is, vertically. Meanwhile, the control boards thereof are provided perpendicularly to the axial direction of the output shaft, that is, horizontally. In addition, each control board serves as a boundary separating the motor and the control unit from each other. Here, an opposite side to an output side of the output shaft of the motor is referred to as "non-output side".

The related-art device includes two power modules and two control circuits configured to drive the power modules independently of each other. In the related-art device, the two power modules and the two control boards are provided vertically on mounting surfaces of a heat sink so as to incorporate the components described above in an outer case of the control unit.

In the related-art device, however, the control board and the power module are stacked, in a radial direction thereof, on each of one pair of opposing mounting surfaces of the heat sink. This leads to a problem of an increase in size of a product, particularly an increase in size in the radial direction. Meanwhile, such an increase in size in the radial direction can be prevented by reducing the width of each control board. However, in this case, in order to secure a mounting area of each control board, it is required to increase the length of each control board so as to compensate for any reduction in mounting area for components, which is caused by reducing the width of each control board. This results in an increase in size of a product in an axial direction.

The present invention has been made to solve the problems described above, and provides an electric power steering device capable of being downsized, which has two circuit configurations in consideration of redundancy.

Solution to Problems

According to the present invention, there is provided an electric power steering device, including: a motor; and a control unit provided in an axial direction of an output shaft of the motor to be integrated with the motor. The motor includes: first motor windings; and second motor windings. The control unit includes: a first power module including a plurality of first switching elements configured to supply current to the first motor windings; a first control board configured to output a control signal to each of the plurality of first switching elements; a second power module including a plurality of second switching elements configured to supply current to the second motor windings; a second control board configured to output a control signal to each of the plurality of second switching elements; a heat sink configured to release heat generated in the control unit; and a housing forming an outer case of the control unit. The heat sink includes a column portion extending in the axial direction of the output shaft on an extension of an axial center of the output shaft in the housing, the column portion having a plurality of mounting portions defined by flat surfaces parallel to the axial direction of the output shaft, the first control board and the second control board being each mounted along a corresponding one of one pair of opposing mounting portions out of the plurality of mounting portions, the first power module and the second power module being each mounted along a corresponding one of another pair of opposing mounting portions out of the plurality of mounting portions.

Advantageous Effects of Invention

According to the present invention, the column portion, the first control board, and the second control board are provided vertically to increase an effective area in the housing. In addition, the first control board and the second control board are each mounted along a corresponding one of the pair of opposing mounting portions out of the plurality of mounting portions, and the first power module and the second power module are each mounted along a corresponding one of the another pair of opposing mounting portions out of the plurality of mounting portions. This configuration prevents the control unit from being increased in radial dimension, and hence the control unit smaller than a motor diameter can be achieved. Further, it is not required to increase the lengths of the first control board and the second control board so as to secure a mounting area for components. This prevents the control unit from being increased in axial dimension. Consequently, the device having two circuit configurations can be downsized.

DESCRIPTION OF EMBODIMENTS

First Embodiment

Figure 1:
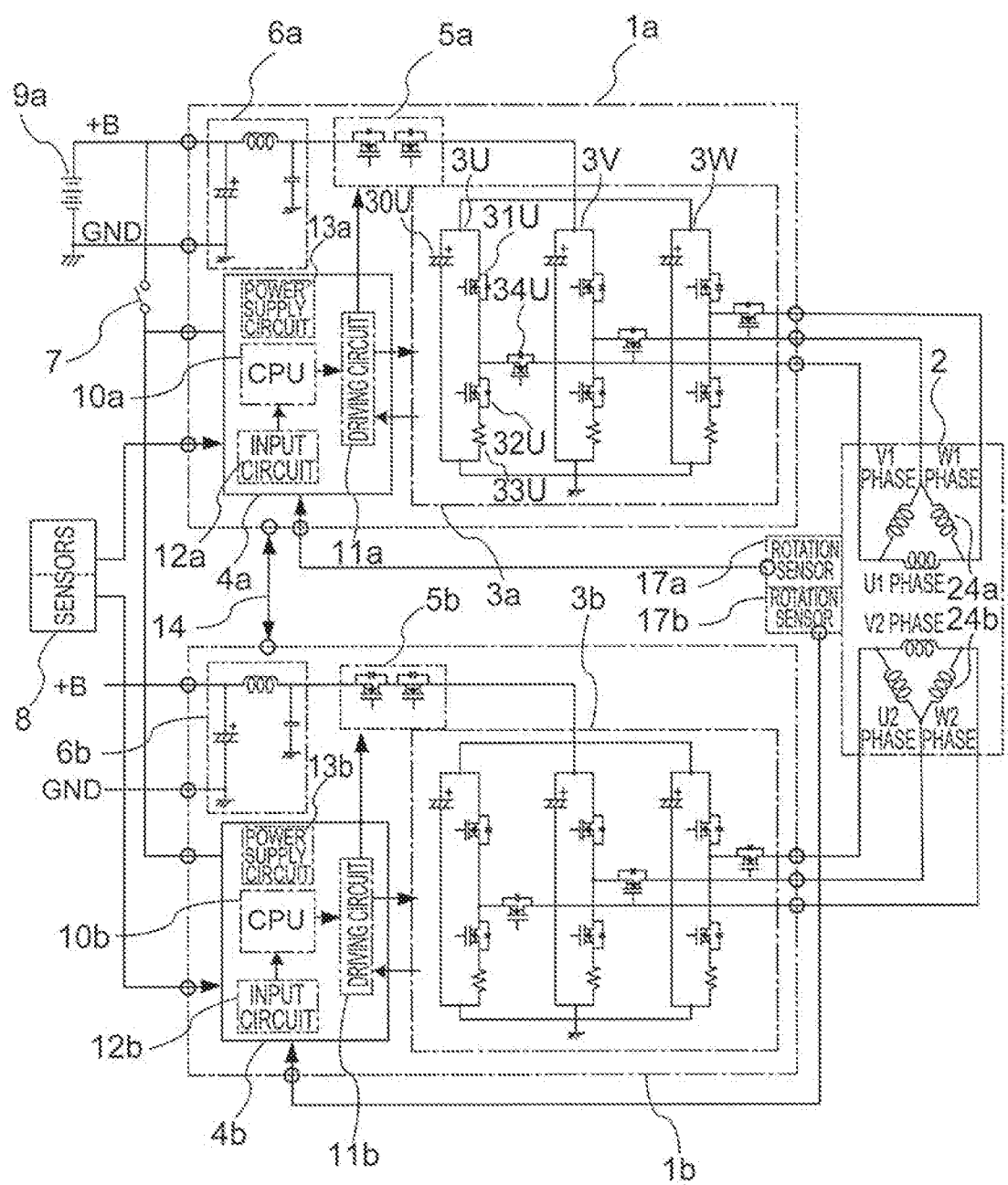
FIG. 1 is a circuit diagram for illustrating an electric power steering device according to a first embodiment of the present invention.
Figure 2:
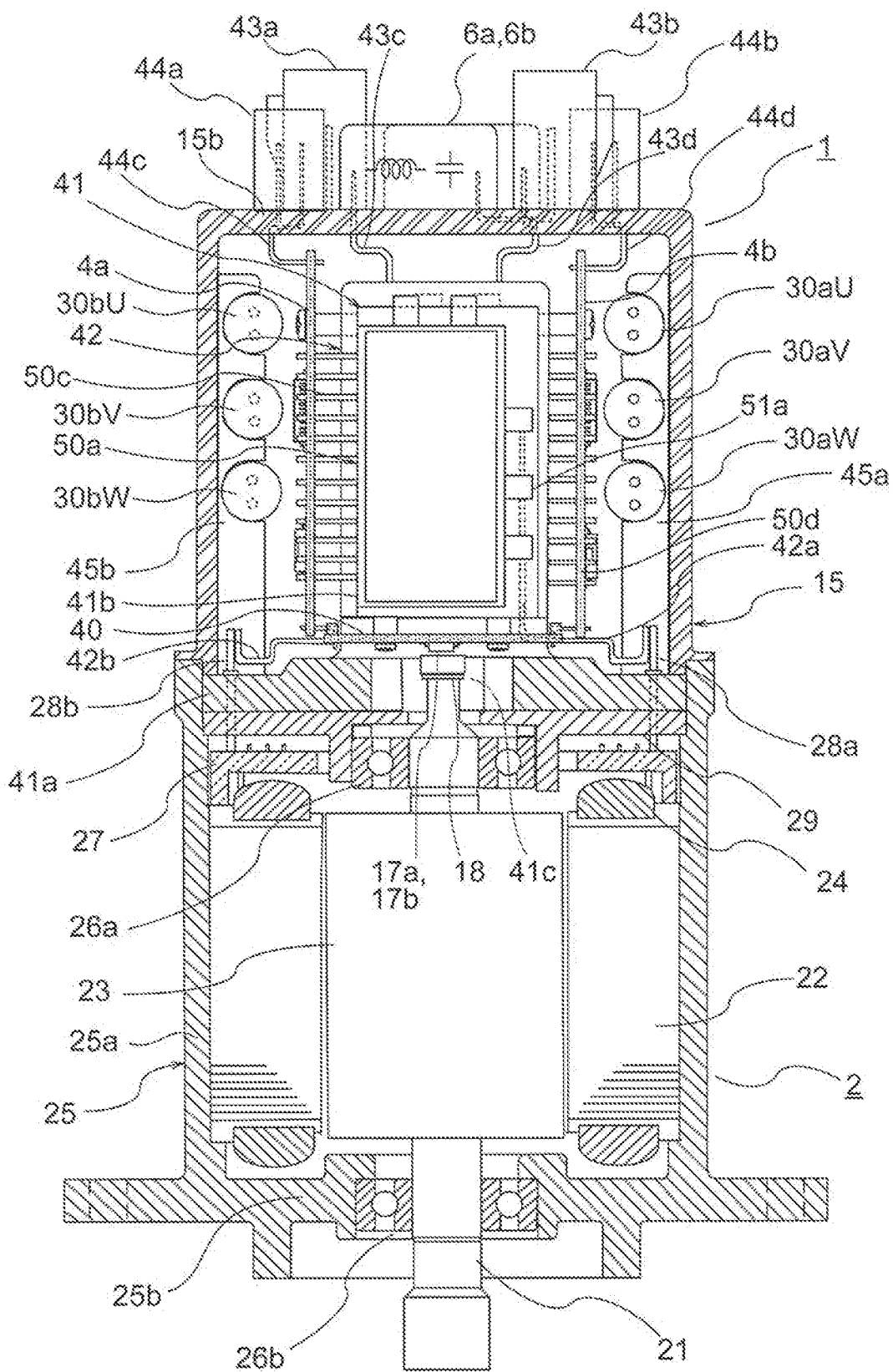
FIG. 2 is a sectional view of the electric power steering device according to the first embodiment of the present invention.
Figure 3:
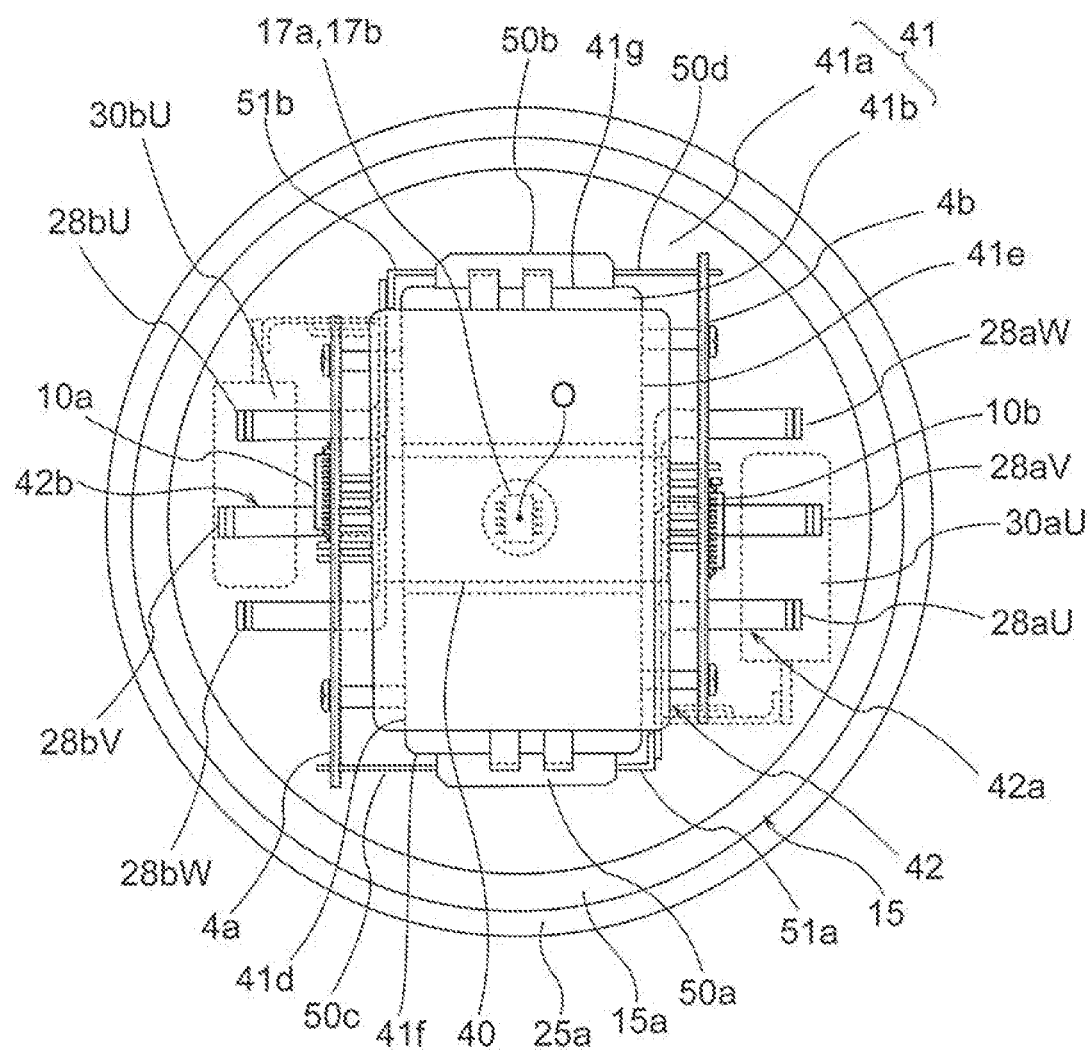
FIG. 3 is a perspective view of a control unit of the electric power steering device according to the first embodiment of the present invention and its surroundings, as viewed from a non-output side.

FIG. 1 is a circuit diagram for illustrating an electric power steering device according to a first embodiment of the present invention. FIG. 2 is a sectional view of the electric power steering device according to the first embodiment of the present invention. FIG. 3 is a perspective view of a control unit of the electric power steering device according to the first embodiment of the present invention and its surroundings, as viewed from a non-output side.

In FIG. 1 and FIG. 2, the electric power steering device includes a control unit 1 and a motor 2. The control unit 1 is provided on one side of the motor 2 in an axial direction of an output shaft 21 thereof so that the control unit 1 and the motor 2 are arranged side by side in a row and integrated together. Further, the electric power steering device is disposed with the axial direction of the output shaft 21 of the motor 2 being set as a vertical direction, and with the control unit 1 being placed in an upper position. The motor 2 outputs power from a lower end portion of the output shaft 21 to, for example, a speed reducer (not shown). Specifically, in FIG. 2, a lower end side of the output shaft 21 corresponds to an output side, and an upper end side of the output shaft 21 corresponds to a non-output side.

Motor windings 24 include two sets of three-phase motor windings 24a and 24b. The motor windings 24a are first motor windings, and the motor windings 34b are second motor windings. The control unit 1 includes control units 1a and 1b dedicated to the two sets of motor windings 24a and 24b, respectively. The control unit 1a includes, for example, a control board 4a, an inverter circuit 3a, a power supply relay 5a, and a filter 6a. The control board 4a is a first control board on which a CPU 10a, various circuits, and other components are mounted. The inverter circuit 3a is configured to supply current to the motor 2. Likewise, the control unit 1b includes, for example, a control board 4b, an inverter circuit 3b, a power supply relay 5b, and a filter 6b. The control board 4b is a second control board on which a CPU 10b, various circuits, and other components are mounted. The inverter circuit 3b is configured to supply current to the motor 2.

First, a circuit configuration of the control unit 1 is described. The control units 1a and 1b have the same configuration. Thus, a description is given only of the control unit 1a.

Power is supplied from an in-vehicle battery 9 to the control unit 1a via an ignition switch 7. A CPU 10a receives information transmitted from sensors 8 such as a vehicle speed sensor for detecting a travel speed of a vehicle, and a torque sensor for detecting a steering torque mounted near a steering wheel. The CPU 10a is configured to calculate a current value as a control amount for rotating the motor 2 based on the information described above, and then output the calculated value. A driving circuit 11a is configured to output, in response to an output signal from the CPU 10a, a drive signal for driving each switching element of the inverter circuit 3a to the inverter circuit 3a. The switching elements of the inverter circuit 3a are first switching elements, and the switching elements of the inverter circuit 3b are second switching elements.

Only small current flows through the driving circuit 11a compared to actual current flowing through the motor. Thus, the driving circuit 11a, which is illustrated as being mounted on the control board 4a, can be provided in the inverter circuit 3a instead.

Further, the filter 6a including a capacitor and a coil is inserted to a power supply system (+B, ground) so as to suppress noise emission caused by PWM driving of the inverter circuit 3a. Further, a power supply relay 5a configured to open/close a +B power supply line is inserted into the middle thereof. The power supply relay 5a includes two switching elements and two parasitic diodes that allow current to flow in forward and reverse directions with respect to a current supply direction. The power supply relay 5a can forcibly interrupt power supply, for example, when any failure occurs in the inverter circuit 3a or the motor 2. Further, the power supply relay 5a can cut off a line in which current flows, upon reverse connection of the battery 9. In this way, the power supply relay 5a also serves as a so-called protection against reverse connection of the battery.

The inverter circuit 3a includes three circuit units 3U, 3V, and 3W corresponding to different phases of three-phase windings 24a. The three circuit units 3U, 3V, and 3W have the same configuration, and hence a description is given only of the circuit unit 3U. The circuit unit 3U includes an upper-arm switching element 31U, a lower-arm switching element 32U, and a relay switching element 34U having a relay function for opening/closing between the U1-phase winding and a node between the upper-arm switching element 31U and the lower-arm switching element 32U. The upper-arm switching element 31U and the lower-arm switching element 32U are PWM-driven in response to a command from the CPU 10a. To that end, a smoothing capacitor 30U is connected in parallel to the upper-arm switching element 31U and the lower-arm switching element 32U so as to reduce noise. Further, a shunt resistor 33U is connected in series to the upper-arm switching element 31U and the lower-arm switching element 32U so as to detect current flowing through the motor 2.

The circuit units 3U, 3V, and 3W have the same circuit configuration for windings of a U1 phase, a V1 phase, and a W1 phase, and can independently supply current to a corresponding winding. In FIG. 1, terminals marked with the symbol "○" are connection terminals provided in the control units 1a and 1b and used for connection to external devices.

Further, a potential difference between both ends of the shunt resistor 33 and voltage of each motor wiring terminal, for example, are also input to an input circuit 12a. The CPU 10a receives such information as well, and serves to calculate a difference from a detection value corresponding to the calculated current value, and perform so-called feedback control, to thereby supply desired motor current and assist a steering force. Further, drive signals for switching elements of the power supply relay 5a are output via the driving circuit 11a. Here, the power supply relay 5a operates as a relay for connection or disconnection between the battery +B and the inverter circuit 3a. In the switching elements of the power supply relay 5a, large current flows and accordingly heat is generated. To address this, the switching elements of the power supply relay 5a may be incorporated into the inverter circuit 3a to form a power module.

The CPU 10a has an abnormality detection function for detecting an abnormality in the sensors 8, the driving circuit 11a, the inverter circuit 3a, the motor windings 24a, and other components based on various types of information thus received. When any abnormality has been detected, the CPU 10a turns off the switching elements of upper and lower arms corresponding to a phase in which the abnormality has been detected, and turns off the relay switching elements in accordance with the abnormality so as to interrupt current supply to the abnormal phase alone, for example. Alternatively, the CPU 10a can turn off the switching elements of the power supply relay 5a so as to shut off the power supply itself. Further, the CPUs 10a and 10b are connected together via a communication line 14 to mutually exchange information. Thus, particularly when one of the CPUs detects an abnormality, the one CPU sends information containing details of the abnormality to the other.

The motor 2 is a brushless motor including the motor windings 24 including the two sets of three-phase motor windings 24a and 24b, each of which are delta-connected. A rotation sensor is mounted for the brushless motor, so as to detect a rotational position of a rotor 23. The rotation sensor also includes two rotation sensors 17a and 17b to secure redundancy. Rotation information from the rotation sensors 17a and 17b are input to the input circuits 12a and 12b of the control boards 4a and 4b, respectively.

It should be noted that the three-phase motor is adopted as the motor, but a multi-phase motor having four or more phases may be adopted. Further, the three-phase windings are delta-connected to form the motor windings, but may be star-connected to form the motor windings. Further, the three-phase brushless motor is adopted as the motor, but two pairs of two-pole blushed motors may be adopted instead. Further, the motor windings may be distributed or concentrated ones. The motor may also be a so-called tandem motor having two stators. It should be noted that, only one set of windings or two cooperative sets of windings can be adopted as long as desired motor rotational speed and output torque are achieved.

As described above, the electric power steering device of the present invention includes, for example, two independent circuit networks, connectors, and sensors, to thereby secure redundancy.

Next, the configuration of the motor 2 is described with reference to FIG. 2.

The motor 2 mainly includes the output shaft 21, the rotor 23, a stator 22, and a motor case 25 having those components incorporated therein.

The motor case 25 has a bottomed cylindrical shape defined by a cylindrical portion 25a and a bottom portion 25b that closes an output side opening of the cylindrical portion 25a. The motor case 25 is made of metal. It is desired that the motor case 25 be made of aluminum in consideration of heat radiating property and an outer shape. A frame 29 is made of metal and has a disk shape. The frame 29 is inserted and held, for example, by press-fitting or shrink-fitting, in a non-output side opening of the cylindrical portion 25a so as to close the non-output side opening of the cylindrical portion 25a. The frame 29 serves as a cover of the motor 2. The motor 2 is separated and independent from the control unit 1 by the frame 29.

The stator 22 is inserted and held, for example, by press-fitting or shrink-fitting, in the cylindrical portion 25a of the motor case 25. The stator 22 includes the three-phase motor windings 24. An annular wiring portion 27 is provided at an output side portion of the frame 29 and near the motor windings 24. Terminal ends of the motor windings 24 are connected to the annular wiring portion 27. Three phase terminals 28a and three phase terminals 28b, through which three phase currents for driving the motor 2 flow, are led out of the annular wiring portion 27 toward the non-output side through the frame 29. Specifically, the three phase terminals 28a are connected to windings of different phases out of the motor windings 24a, and the three phase terminals 28b are connected to windings of different phases out of the motor windings 24b.

The rotor 23 is fixed to the output shaft 21 so as to be rotatable in the motor case 25. The output shaft 21 is supported by a bearing 26a provided at an axial center of the frame 29, and a bearing 26b provided at an axial center of the bottom portion 25b. The rotor 23 is coaxially provided in the stator 22. A sensor rotor 18 is provided at an end of the output shaft 21 protruding from the frame 29. Although not shown, a plurality of permanent magnets are arranged on an outer peripheral surface of the rotor 23 at regular pitches with N pole and S pole alternately arranged in a circumferential direction.

With reference to FIG. 2 and FIG. 3, the configuration of the control unit 1 is described next.

An area of the control unit 1 in a radial direction, that is, a direction orthogonal to the output shaft 21 is required to be equivalent to or smaller than that of the motor 2. To that end, the control unit 1 is mounted vertically so that main parts thereof are provided in parallel to the output shaft 21.

The control unit 1 is covered by a resin-made housing 15 at its outer layer. In other words, the housing 15 forms an outer case of the control unit 1. The housing 10 has a bottomed cylindrical shape defined by a cylindrical peripheral wall 15a that covers the components of the control unit 1, and a bottom portion 15b that closes an opening of the peripheral wall 15a on one side. A non-output side end surface of the bottom portion 15b is a flat surface orthogonal to the axial direction of the output shaft 21. The housing 15 is fitted, with its opening facing downward, into the opening of the cylindrical portion 25a of the motor case 25, and is fixed to the cylindrical portion 25a with use of screws (not shown). The non-output side end surface of the bottom portion 15b of the housing 15 has provided thereon power supply connectors 43a and 43b to be connected to the battery 9 as an external power supply, and a plurality of signal connectors 44a and 44b to be connected to the sensor 8 and the like. Further, the non-output side end surface of the bottom portion 15b of the housing 15 has mounted thereon, for example, the filters 6a and 6b that are relatively large components. The power supply connectors 43a and 43b are connectors through which large current flows, and the signal connectors 44a and 44b are connectors through which small current flows compared with the current flowing through the power supply connectors 43a and 43b. The power supply connector 43a and the power supply connector 43b are a first power supply connector and a second power supply connector, respectively. Further, the signal connector 44a and the signal connector 44b are a first signal connector and a second signal connector, respectively.

The housing 15 has provided therein, for example, a heat sink 41, the control boards 4a and 4b, power modules 50a and 50b having incorporated therein a plurality of switching elements as components of the inverter circuit 3a and 3b, and smoothing capacitors 30U, 30V, and 30W. The power module 50a and the power module 50b are a first power module and a second power module, respectively.

The heat sink 41 is made of a material having high heat conductivity such as aluminum and copper, and includes a disk-like base portion 41a and a rectangular column portion 41b formed upright at the center of the base portion 41a. The base portion 41a of the heat sink 41 is provided inside the non-output side opening of the cylindrical portion 25a. The base portion 41a is pressure-held between the frame 29 and the peripheral wall 15a of the housing 15 mounted to the cylindrical portion 25a. Thus, the heat sink 41 is fixed to the motor 2. The base portion 41a is in contact with an inner peripheral wall surface of the cylindrical portion 25a and also with a non-output side end surface of the frame 29. The column portion 41b is located on an axial center O of the extension of the output shaft 21, inside the housing 15. The column portion 41b includes four mounting portions 41d, 41e, 41f, and 41g each defined by a flat surface parallel to the axial direction of the output shaft 21.

A recess 41c is formed to open to a lower portion of the base portion 41a and to the base portion 41a side of the column portion 41b. A protruding end of the output shaft 21, which protrudes from the frame 29, that is, a non-output side end portion of the output shaft 21 is inserted to the recess 41c, and positioned inside the base portion 41a. The sensor rotor 18 is mounted to the non-output side end portion of the output shaft 21. The sensor rotor 18 includes one pair, or a plurality of pairs of magnet rotors. A circuit board 40 is provided opposite to the sensor rotor 18 in the recess 41c. The rotation sensors 17a and 17b are mounted on the circuit board 40 so as to face the sensor rotor 18. The rotation sensors 17a and 17b serve to independently detect a change in magnetic field caused by rotation of the sensor rotor 18. With this operation, the rotation sensors 17a and 17b independently detect rotation of the output shaft 21. The rotation sensors 17a and 17b are incorporated into one package but may be provided in different packages.

The circuit board 40 is provided inside the recess 41c formed on the output side of the heat sink 41, and thus has a smaller area than those of the control boards 4a and 4b. Power supply lines and signal lines of the rotation sensors 17a and 17b are led out separately on the right and left sides of FIG. 2 via a wiring pattern of the circuit board 40, and are connected to the lower ends of the control boards 4a and 4b, respectively. Note, that the sensor rotor 18 and the rotation sensors 17a and 17b are described as magnetic sensor type ones, but are not limited thereto and may be resolver or Hall sensors.

The power module 50a is obtained by sealing with a resin the switching elements of the inverter circuit 3a, which are being mounted on wirings. The power module 50b is obtained by sealing with a resin the switching elements of the inverter circuit 3b, which are being mounted on wirings. The power modules 50a and 50b are mounted in close contact to one pair of opposing mounting portions 41f and 41g of the column portion 41b, respectively.

The control board 4a is formed into a flat rectangular shape. On the control board 4a, the CPU 10a, the driving circuit 11a, the input circuit 12a, the power supply circuit 13a, and other components are mounted. Likewise, the control board 4b is formed into a flat rectangular shape. On the control board 4b, the CPU 10b, the driving circuit 11b, the input circuit 12b, the power supply circuit 13b, and other components are mounted. The control boards 4a and 4b are mounted in parallel to another pair of opposing mounting portions 41d and 41e of the column portion 41b, respectively. The control board 4a is to be connected to signal lines 50c of the power module 50a. To that end, the control board 4a is mounted on the mounting portion 41d so as to protrude from the mounting portion 41d toward the power module 50a side. With this arrangement, the control board 4a and the power module 50a overlap each other as viewed from a direction orthogonal to the mounting portion 41d. The control board 4b is to be connected to signal lines 50d of the power module 50b. To that end, the control board 4b is mounted on the mounting portion 41e so as to protrude from the mounting portion 41e toward the power module 50b side. With this arrangement, the control board 4b and the power module 50b overlap each other as viewed from a direction orthogonal to the mounting portion 41e.

Each signal line 44c of the signal connector 44a is led out of the bottom portion 15b into the housing 15, and connected to an upper end of the control board 4a close to the signal connector 44a. Meanwhile, each signal line 44d of the signal connector 44b is led out of the bottom portion 15b into the housing 15, and connected to an upper end of the control board 4b close to the signal connector 44b. With this arrangement, the signal lines 44c and 44d are connected to the input circuits 12a and 12b of the control boards 4a and 4b, respectively.

A power supply line 43c of the power supply connector 43a is led out of the bottom portion 15b into the housing 15 via the filter 6a. The power supply line 43c led out into the housing 15 is connected to the power supply line of the inverter circuit 3a or the power supply relay 5a via a bus bar of a relay member 42. Meanwhile, a power supply line 43d of the power supply connector 43b is led out of the bottom portion 15b into the housing 15 via the filter 6b. The power supply line 43d led out into the housing 15 is connected to the power supply line of the inverter circuit 3b or the power supply relay 5b via a bus bar of a relay member 42.

Output terminals 51a of the inverter circuit 3a are led out of the power module 50a toward the control board 4b side. The output terminals 51a are connected to extension terminals 42a via the bus bar of the relay member 42. The extension terminals 42a pass a region on the motor 2 side of the control board 4b, and are led out toward the radially outer side. Meanwhile, output terminals 51b of the inverter circuit 3b are led out of the power module 50b toward the control board 4a side. The output terminals 51b are connected to extension terminals 42b via the bus bar of the relay member 42. The extension terminals 42b pass a region on the motor 2 side of the control board 4a, and are led out toward the radially outer side.

The phase terminals 28a connected to the windings of different phases out of the motor windings 24a pass through the frame 29 and the base portion 41a, and are led out into the housing 15. The phase terminals 28a (28aU, 28aV, and 28aW) are each connected to a corresponding one of the extension terminals 42a in the region on the motor 2 side of the control board 4b and on the radially outer side. Meanwhile, the phase terminals 28b connected to the windings of different phases out of the motor windings 24b pass through the frame 29 and the base portion 41a, and are led out into the housing 15. The phase terminals 28b (28bU, 28bV, and 28bW) are each connected to a corresponding one of the extension terminals 42b in the region on the motor 2 side of the control board 4a and on the radially outer side.

Smoothing capacitors 30aU, 30aV, and 30aW are fixed to a support member 45a so as to be stacked vertically on one another on the radially outer side of the control board 4b. Specifically, the smoothing capacitors 30aU, 30aV, and 30aW are arranged in a row in the axial direction of the output shaft 21 and in parallel to the mounting portion 41e with their length direction being orthogonal to the axial direction of the output shaft 21. The smoothing capacitors 30aU, 30aV, and 30aW are provided closer to the power supply connector 43a and the signal connector 44a as viewed from the non-output side of the output shaft 21 in the axial direction.

Meanwhile, smoothing capacitors 30bU, 30bV, and 30bW are fixed to a support member 45b so as to be stacked vertically on one another on the radially outer side of the control board 4a. Specifically, the smoothing capacitors 30bU, 30bV, and 30bW are arranged in a row in the axial direction of the output shaft 21 and in parallel to the mounting portion 41d with their length direction being orthogonal to the axial direction of the output shaft 21. The smoothing capacitors 30bU, 30b, and 30b are provided closer to the power supply connector 43b and the signal connector 44b as viewed from the non-output side of the output shaft 21 in the axial direction.

Terminals of the smoothing capacitors 30 are connected to the power supply line of the relay member 42, and the power supply lines wired in the power modules 50a and 50b.

Effects attained by the thus-configured device are described next.

In the control unit 1, the rectangular column portion 41b of the heat sink 41, the control boards 4a and 4b, the power modules 50a and 50b, and other components are provided vertically in the housing 15. With this arrangement, the electric power steering device can be downsized.

The control boards 4a and 4b are each provided along a corresponding one of the pair of opposing mounting portions 41d and 41e of the column portion 41b. The power modules 50a and 50b are each provided along a corresponding one of the other pair of opposing mounting portions 41f and 41g of the column portion 41b. This configuration prevents the control unit 1 from being enlarged in the radial direction compared to the configuration of the related-art device in which the control board 4a and the power module 50a are mounted on the mounting portion 41d while being stacked in the radial direction, and the control board 4b and the power module 50b are mounted on the mounting portion 41e while being stacked in the radial direction. Consequently, the control unit 1 smaller than the diameter of the motor 2 can be achieved. As the control unit 1 smaller than the diameter of the motor 2 can be achieved, it is not required to reduce the widths of the control boards 4a and 4b. As a result, the mounting area for components can be secured without increasing the lengths of the control boards 4a and 4b, and the increase in size of the control unit 1 in the axial direction can be prevented. With this configuration, the device having two circuit configurations can be downsized.

The rectangular column portion 41b of the heat sink 41 is located on an axial center O of the output shaft 21. The heat sink 41 and the control boards 4a and 4b are each point-symmetric with respect to the axial center O of the output shaft 21 as viewed from the non-output side of the output shaft 21 in the axial direction. With this arrangement, the circuits of two systems can be mounted in a small size, and hence a size of a product can be reduced, particularly in the radial direction.

The power supply connectors 43a and 43b and the signal connectors 44a and 44b are provided at the outermost end portion of the device. Further, the power supply connectors 43a and 43b and the signal connectors 44a and 44b are each point-symmetric with respect to the axial center O of the output shaft 21 as viewed from the non-output side of the output shaft 21 in the axial direction. With this arrangement, the circuits of two systems can be mounted, and hence a size of a product can be reduced, particularly in the radial direction.

The two power modules 50a and 50b as well as the control boards 4a and 4b and the heat sink 41 are point-symmetric with respect to the axial center O of the output shaft 21, as viewed from the non-output side of the output shaft 21 in the axial direction. This produces an effect of allowing the power modules 50a and 50b of the two systems to mutually cancel switching noise generated by large current flowing therethrough in addition to the effect of reducing a size of a product. Consequently, for example, effects of improving angle detection accuracy of the rotation sensors 17a and 17b and of reducing radio noise are obtained.

The control units 1a and 1b of the same size and configuration are separated and independent from each other and thus are allowed to form two systems, to thereby secure the redundancy.

The power modules 50a and 50b are mounted on the pair of mounting portions 41f and 41g, respectively, which correspond to the short sides of the rectangular cross section orthogonal to the axial center O of the column portion 41b. The control boards 4a and 4b are mounted on the pair of mounting portions 41d and 41e, respectively, which correspond to the long sides of the rectangular cross section orthogonal to the axial center O of the column portion 41b, so as to extend toward the power module 50a or 50b side of a corresponding system. In this way, the control boards 4a and 4b protrude from the mounting portions 51d and 41e, respectively, to thereby overlap the power module 50a or 50b of a corresponding system as viewed from the direction orthogonal to the mounting portions 41d and 42e, with the result that the mounting region can be increased.

The sensor rotor 18 is mounted to the end portion of the output shaft 21 protruding from the frame 29 so as to be located inside the recess 41c formed at the motor 2 side region of the heat sink 41. The circuit board 40 is provided opposite to the output shaft 21 in the recess 41c. Further, the rotation sensors 17a and 17b are provided on the circuit board 40 so as to face the sensor rotor 18. This enables size reduction of the device, particularly in the axial direction. Further, the rotation sensors 17a and 17b are provided inside the recess 41c, and are thus hardly susceptible to noise generated through on/off operations for supplying current to the motor windings 24a and 24b.

The control boards 4a and 4b and the power modules 50a and 50b of the control units 1a and 1b are each provided separately and independently from each other. The control boards 4a and 4b are point-symmetric with respect to the axial center O of the output shaft 21, as viewed from the non-output side of the output shaft 21 in the axial direction. With this arrangement, the phase terminals 28a and 28b for the motor windings 24a and 24b can be connected to any one of the control boards 4a and 4b, to thereby enable easier assembly.

In the first embodiment described above, two connectors are provided for the power supply system and the signal system, but one connector may be led out into the housing and then branched into two for the power supply system and the signal system.

Second Embodiment

Figure 4:
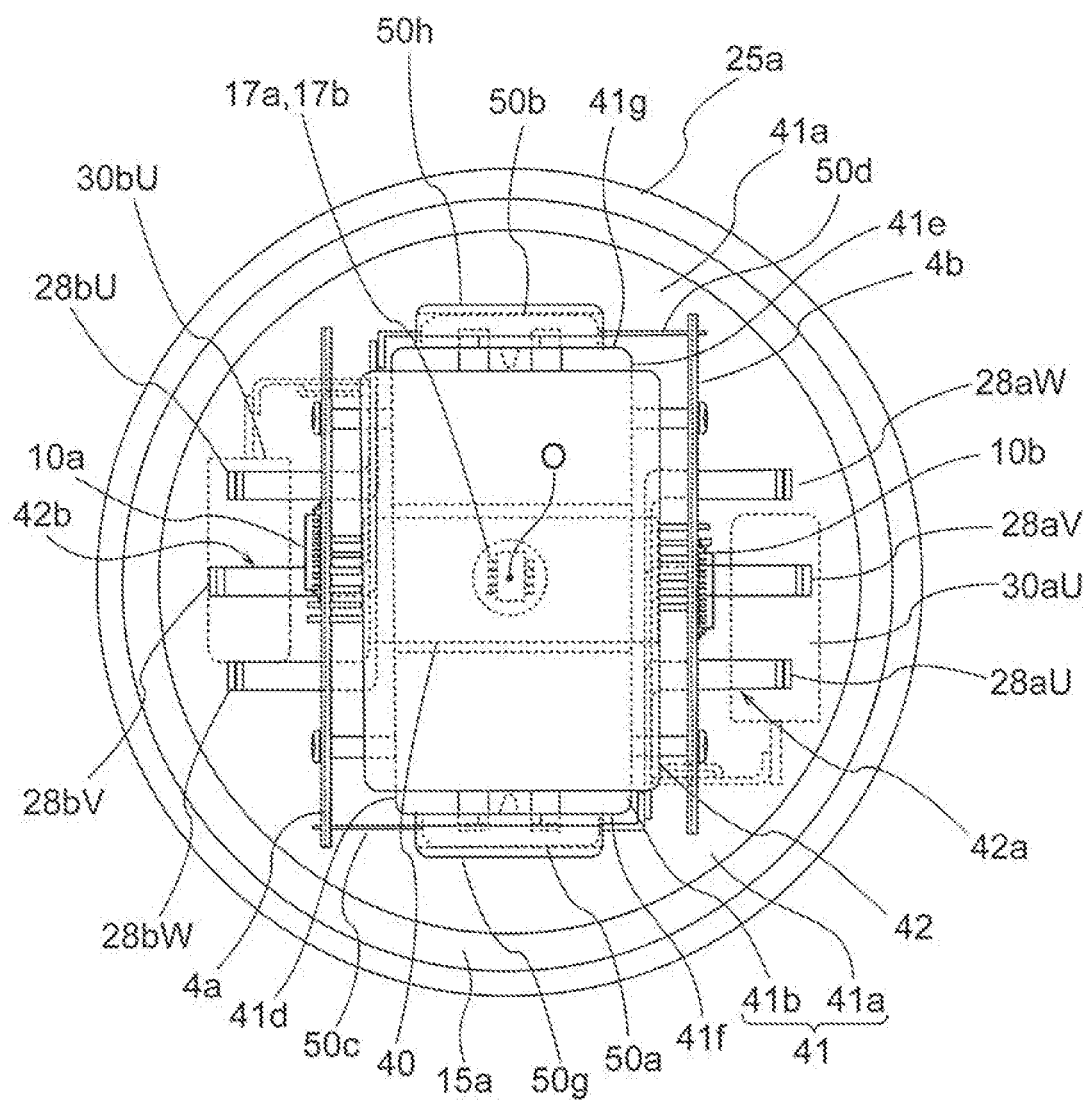
FIG. 4 is a perspective view of a control unit of an electric power steering device according to a second embodiment of the present invention and its surroundings, as viewed from a non-output side.

FIG. 4 is a perspective view of a control unit of an electric power steering device according to a second embodiment of the present invention and its surroundings, as viewed from a non-output side.

In FIG. 4, the power module 50a is held in close contact onto the column portion 41b of the heat sink 41 by a holding member 50g. The power module 50b is held in close contact onto the column portion 41b by a holding member 50h. When the holding members 50g and 50h are made of a heat radiating material, for example, a copper plate, the heat radiation property of the power modules 50a and 50b can be accordingly enhanced.

The control board 4a is mounted on the mounting portion 41d of the column portion 41b so as to protrude on both sides of the column portion 41b in the width direction thereof. For secure connection to the signal lines 50c of the power module 50a, the control board 4a is provided to overlap the power module 50a in a larger amount than an amount of overlap with the power module 50b as viewed from the direction orthogonal to the mounting portion 41d. The control board 4b is mounted on the mounting portion 41e of the column portion 41b so as to protrude beyond both ends of the column portion 41b in the width direction thereof. For secure connection to the signal lines 50d of the power module 50b, the control board 4b is provided to overlap the power module 50b in a larger amount than an amount of overlap with the power module 50a as viewed from the direction orthogonal to the mounting portion 41e.

Further, the smoothing capacitors 30U, 30V, and 30W are provided close to the motor 2 side in the axial direction of the output shaft 21, on the radially outer side of the control boards 4a and 4b. This arrangement shortens electrical connection lengths between terminals of the smoothing capacitors 30U, 30V, and 30W and the power supply line of the relay member 42 or the power modules 50a and 50b, and thus produces an effect of reducing noise.

The other configuration is the same as that of the first embodiment.

In the second embodiment as well, the heat sink 41, the control boards 4a and 4b, the power modules 50a and 50b, the power supply connectors 43a and 43b, the signal connectors 44a and 44b, and the smoothing capacitors 30 are each point-symmetric with respect to the axial center O of the output shaft 21 as viewed from the non-output side of the output shaft 21 in the axial direction.

Therefore, the same configuration as the first embodiment is achieved also in the second embodiment.

Further, in the second embodiment, the control boards 4a and 4b protrude on both sides of the mounting portions 41d and 41e in the width direction, respectively. Consequently, the mounting regions of the control boards 4a and 4b can be increased, and a large number of components can be mounted without increasing the size of the control unit as compared with the first embodiment described above.

In the first and second embodiments described above, the column portion 41b of the heat sink 41 has a rectangular shape in a top view seen from the axially outer side of the output shaft 21. It should be noted that the column portion 41b is not limited to the rectangular shape in a top view, and can have any polygonal shape having four mounting portions, on which at least two control boards and two power modules are to be mounted.

Third Embodiment

Figure 5:
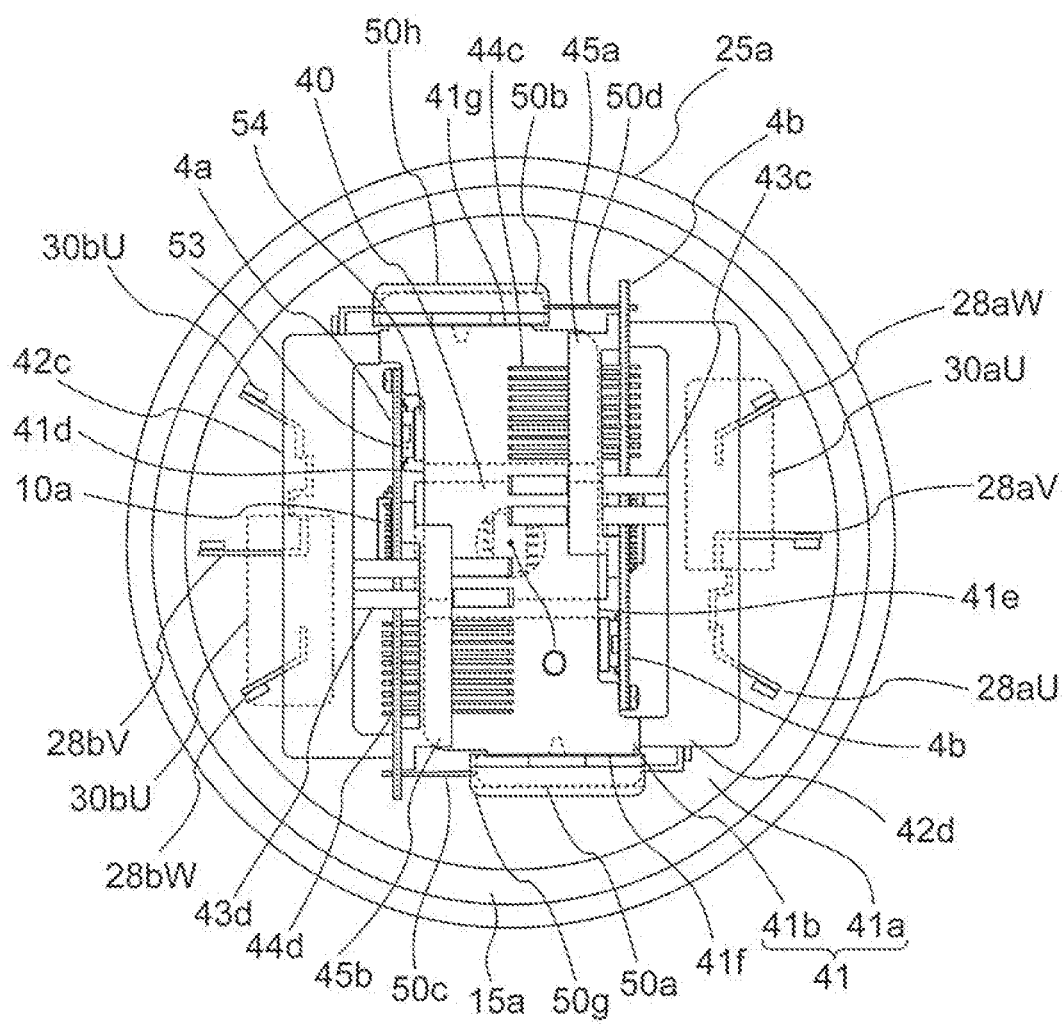
FIG. 5 is a perspective view of a control unit of an electric power steering device according to a third embodiment of the present invention and its surroundings, as viewed from a non-output side.
Figure 6:
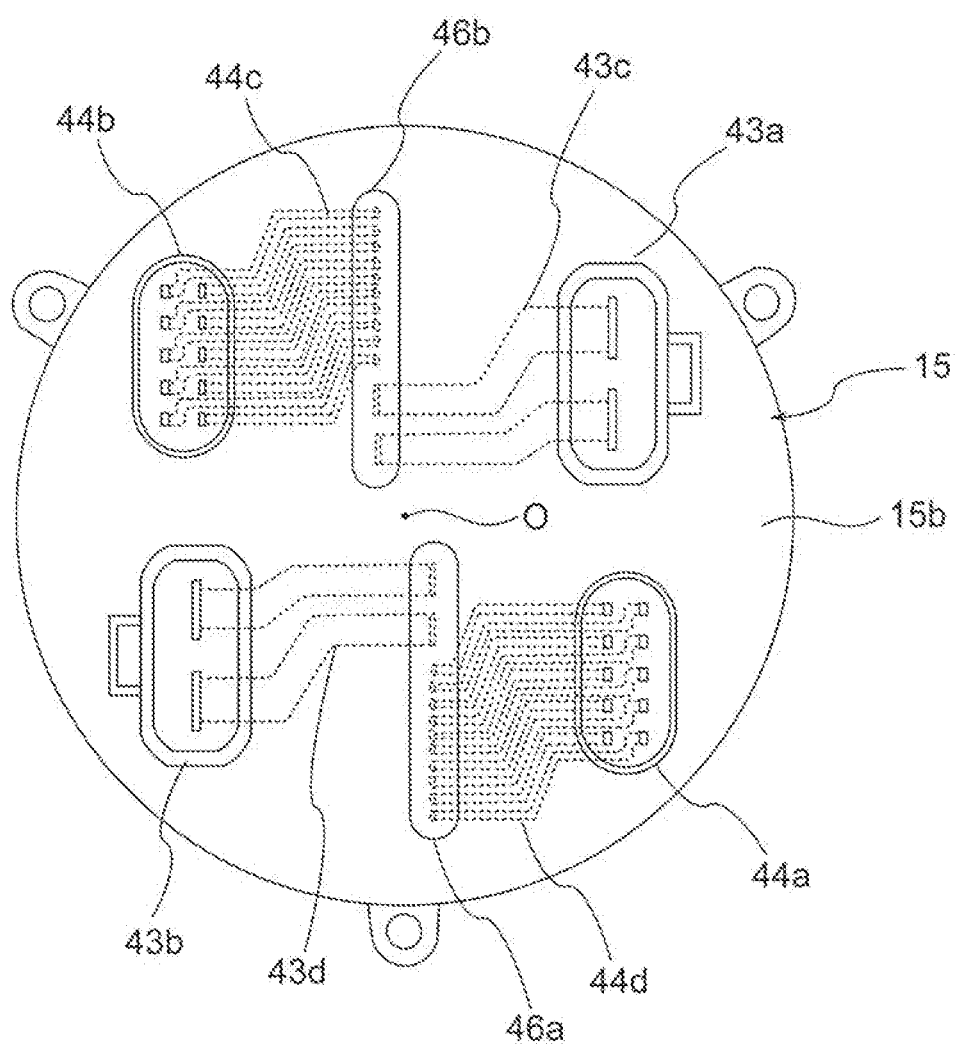
FIG. 6 is an end view of the electric power steering device according to the third embodiment of the present invention, as viewed from the non-output side.

FIG. 5 is a perspective view of a control unit of an electric power steering device according to a third embodiment of the present invention and its surroundings, as viewed from a non-output side. FIG. 6 is an end view of the electric power steering device according to the third embodiment of the present invention, as viewed from the non-output side.

In FIG. 5, the column portion 41b of the heat sink 41 has the mounting portion 41g side that corresponds to one short side of the rectangular shape, and protrudes toward the mounting portion 41d corresponding to one long side thereof, as viewed from the non-output side of the output shaft 21 in the axial direction. Further, the column portion 41b of the heat sink 41 has the mounting portion 41f side that corresponds to another short side of the rectangular shape, and protrudes toward the mounting portion 41e side corresponding to another long side thereof, as viewed from the non-output side of the output shaft 21 in the axial direction.

With this arrangement, in the column portion 41b of the heat sink 41, the end portion of the mounting portion 41d on the mounting portion 41g side protrudes toward an opposite side to the mounting portion 41e, and the end portion of the mounting portion 41e on the mounting portion 41f side protrudes toward an opposite side to the mounting portion 41d. The control boards 4a and 4b are mounted in regions except the protruding portions of the mounting portions 41d and 41e, respectively. The power module 50a is mounted on the mounting portion 41f while being shifted away from the control board 4a toward the protruding portion side. The power module 50b is mounted on the mounting portion 41g while being shifted away from the control board 4b toward the protruding portion side. With this arrangement, the mounting regions of the control boards 4a and 4b are increased compared to the first embodiment.

The control boards 4a and 4b are provided with some distance from the mounting portions 41d and 41e of the column portion 41b, respectively. Heat generating components 53 mounted on the control boards 4a and 4b are brought into contact with heat radiating portions 54 protruding from the mounting portions 41d and 41e, respectively, via heat radiating members having a high heat conductivity such as glue or sheets, for example. With this arrangement, heat generated by the heat generating components 53 is effectively released to the heat sink 41 via the heat radiating portions 54, to thereby prevent excessive temperature increase.

As illustrated in FIG. 6, the power supply connectors 43a and 43b, and the signal connectors 44a and 44b are provided at an outer surface that is a non-output side surface of the bottom portion 15b of the housing 15.

The power supply lines 43d as a terminal group extending from the power supply connector 43b are collectively passed through the inside of the bottom portion 15*b* of the housing 15 up to almost a central portion of the bottom portion 15*b*, and are led out of the central portion of the bottom portion 15*b* into the housing 15. Further, the power supply lines 43*d* are supported to the bottom portion 15*b* by the support member 45*b* so as to extend along an inner surface of the bottom portion 15*b* toward a radially inner side, and are connected to the power supply lines of the control board 4*a* and the relay member 42*c*.

The signal lines 44*d* as a terminal group extending from the signal connector 44*a* are passed through the inside of the bottom portion 15*b* of the housing 15 up to a radially outer side of the led-out portions of the power supply lines 43*d* that are led out into the housing 15, and are led out of the bottom portion 15*b* into the housing 15. Further, the signal lines 44*d* are supported to the bottom portion 15*b* by the support member 45*b* so as to extend along the inner surface of the bottom portion 15*b* toward the radially inner side and establish connection with the signal lines of the control board 4*a*.

The power supply lines 43*c* as a terminal group extending from the power supply connector 43*a* are collectively passed through the inside of the bottom portion 15*b* of the housing 15 up to almost a central portion of the bottom portion 15*b*, and are led out of the central portion of the bottom portion 15*b* into the housing 15. Further, the power supply lines 43*c* are supported to the bottom portion 15*b* by the support member 45*a* so as to extend along an inner surface of the bottom portion 15*b* toward a radially inner side, and are connected to the power supply lines of the control board 4*b* and the relay member 42*d*.

The signal lines 44*c* as a terminal group extending from the signal connector 44*b* are passed through the inside of the bottom portion 15*b* of the housing 15 up to a radially outer side of the led-out portions of the power supply lines 43*c* that are led out into the housing 15, and are led out of the bottom portion 15*b* into the housing 15. Further, the signal lines 44*c* are supported to the bottom portion 15*b* by the support member 45*a* so as to extend along the inner surface of the bottom portion 15*b* toward the radially inner side and establish connection with the signal lines of the control board 4*b*.

The power supply connectors 43*a* and 43*b*, the power supply line 43*c* and 43*d*, the signal connectors 44*a* and 44*b*, the signal lines 44*c* and 44*d*, and the support members 45*a* and 45*b* are each point-symmetric with respect to the axial center O of the output shaft 21 as viewed from the non-output side of the output shaft 21 in the axial direction. The power supply lines 43*c* and 43*d*, and the signal lines 44*c* and 44*d* are provided almost linearly, which produces an effect of standardization in terms of workability and ease of assembly as well.

Further, as illustrated in FIG. 5, the phase terminals 28*a*U, 28*a*V, and 28*a*W for the motor windings 24*a*, and the phase terminals 28*b*U, 28*b*V, and 28*b*W for the motor windings 24*b* are point-symmetric with respect to the axial center O of the output shaft 21 as viewed from the non-output side of the output shaft 21 in the axial direction. Further, the phase terminals 28*a*U, 28*a*V, and 28*a*W, and the phase terminals 28*b*U, 28*b*V, and 28*b*W are connected to extension terminals of the output terminals from the power modules 50*a* and 50*b* at regions on a radially outer side of the control boards 4*a* and 4*b*, which are closer to the motor 2 side than the control boards 4*a* and 4*b*. As described above, most components of the control unit 1 in the housing 15 are arranged point-symmetrically with respect to the axial center O of the output shaft 21 as viewed from the non-output side of the output shaft 21 in the axial direction. With this arrangement, those components also mutually cancel noise generated by switching current upon driving the motor, to thereby produce an effect of reducing noise emission.

Further, as illustrated in FIG. 6, the power supply connectors 43*a* and 43*b* and the signal connectors 44*a* and 44*b* are each point-symmetric with respect to the axial center O of the output shaft 21 as viewed from the non-output side of the output shaft 21 in the axial direction. The power supply lines 43*c* extending from the terminals of the power supply connector 43*a*, and the signal lines 44*c* extending from the terminals of the signal connector 44*b* are integrated into a terminal group 46*b* and led out into the housing 15 and then connected to target power supply line and signal line. The power supply lines 43*d* of the power supply connector 43*b* and the signal lines 44*d* of the signal connector 44*a* are similarly integrated into a terminal group 46*a* and led out into the housing 15 and then connected to target power supply line and signal line. With this arrangement, all main components inside and outside the housing 15 are point-symmetric with respect to the axial center O of the output shaft 21 as viewed from the non-output side of the output shaft 21 in the axial direction. Therefore, during an assembly process, the control boards 4*a* and 4*b* can be assembled through the same operation irrespective of whether the control board faces the right side or the left side, which enables easy handling of the device. Further, the power supply connector and the signal connector are provided away from each other in the vertical direction of FIG. 6, but can be provided away from each other in the lateral direction.

Fourth Embodiment

Figure 7:
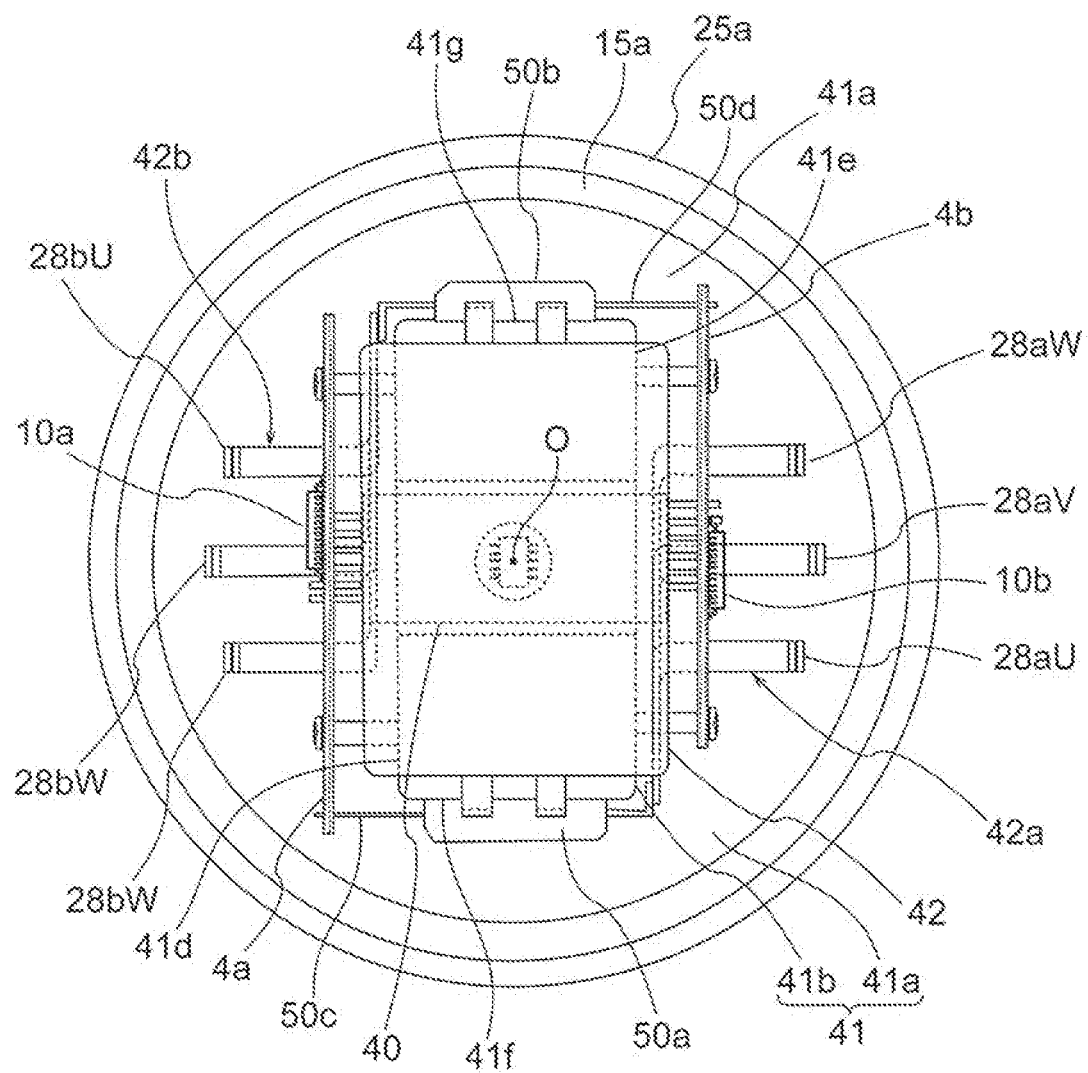
FIG. 7 is a perspective view of a control unit of an electric power steering device according to a fourth embodiment of the present invention and its surroundings, as viewed from a non-output side.

FIG. 7 is a perspective view of a control unit of an electric power steering device according to a fourth embodiment of the present invention and its surroundings, as viewed from a non-output side.

In FIG. 7, the control boards 4*a* and 4*b* are mounted on the pair of opposing mounting portions 41*d* and 41*e* of the column portion 41*b* of the heat sink 41, respectively. The power modules 50*a* and 50*b* are mounted on the other pair of opposing mounting portions 41*f* and 41*g* of the column portion 41*b* of the heat sink 41, respectively. The control board 4*b* and the power module 50*b* are formed smaller than the control board 4*a* and the power module 50*a*. The other configuration is the same as that of the first embodiment.

In the electric power steering device of the fourth embodiment, the power module 50*a* serves for a system having a large current capacity for driving the motor 2, and the power module 50*b* serves for a system having a small current capacity for driving the motor 2.

Further, the electric power steering device may also be applied to a system in which during normal operation, the control unit 1*a* is mainly used, and the control unit 1*b* is subordinately used.

In the fourth embodiment as well, the control boards 4*a* and 4*b* are mounted on the pair of opposing mounting portions 41*d* and 41*e* of the column portion 41*b* of the heat sink 41, respectively, and the power modules 50*a* and 50*b* are mounted on the other pair of mounting portions 41*f* and 41*g* of the column portion 41*b* of the heat sink 41, respectively. Therefore, also in the fourth embodiment, the device having two circuit configurations can be downsized.

In the embodiments described above, the motor is described as the three-phase motor, but may be a multi-phase coil motor having three or more phases.

Further, in the embodiments described above, the description has been given of the two sets of three-phase motor windings, but one set of three-phase motor windings can be used instead. In this case, the following configuration is adopted: one system includes a first power module in which switching elements as components of the circuit units 3U and 3V are incorporated, and the first control board configured to output control signals to those switching elements, and another system includes a second power module in which switching elements as components of the circuit unit 3W and the power supply relay are incorporated, and a second control board configured to output control signals to those switching elements. In addition, the first control board and the second control board may be each mounted along a corresponding one of the pair of mounting portions 41d and 41e of the column portion 41b, and the first power module and the second power module may be each mounted along a corresponding one of the other pair of mounting portions 41f and 41g of the column portion 41b.

REFERENCE SIGNS LIST 1, 1a, 1b control unit, 2 motor, 4a control board (first control board), 4b control board (second control board), 15 housing, 17a, 17b rotation sensor, 18 sensor rotor, 21 output shaft, 24a motor winding (first motor winding), 24b motor winding (second motor winding), 31U upper-arm switching element, 32U lower-arm switching element, 34U relay switching element, 41 heat sink, 41b column portion, 41c recess, 41d to 41g mounting portion, 43a power supply connector (first power supply connector), 43b power supply connector (second power supply connector), 44a signal connector (first signal connector), 44b signal connector (second signal connector), 50a power module (first power module), 50b power module (second power module)

The invention claimed is:

1. An electric power steering device, comprising:
a motor; and
a control unit provided in an axial direction of an output shaft of the motor to be integrated with the motor,
the motor including a first set and a second set of three phase motor windings:
the control unit including:
a first power module including a plurality of first switching elements configured to supply current to the first set of three phase motor windings;
a first control board configured to output a control signal to each of the plurality of first switching elements;
a second power module including a plurality of second switching elements configured to supply current to the second set of three phase motor windings;
a second control board configured to output a control signal to each of the plurality of second switching elements;
a heat sink configured to release heat generated in the control unit; and
a housing forming an outer case of the control unit,
the heat sink including a column portion extending in the axial direction of the output shaft on an extension of an axial center of the output shaft in the housing,
the column portion having a plurality of mounting portions defined by flat surfaces parallel to the axial direction of the output shaft,
the first control board and the second control board being each mounted along a corresponding one of one pair of opposing mounting portions out of the plurality of mounting portions,
the first power module and the second power module being each mounted along a corresponding one of another pair of opposing mounting portions out of the plurality of mounting portions.

2. The electric power steering device according to claim 1,
wherein a group of first phase terminals for the first set of three phase motor windings and a group of second phase terminals for the second set of three phase motor windings are led out into the housing on a group basis,
wherein an end portion of the group of first phase terminals led out into the housing is connected to an output terminal of the first power module on a radially outer side of the first control board or the second control board,
wherein an end portion of the group of second phase terminals led out into the housing is connected to an output terminal of the second power module on the radially outer side of the first control board or the second control board, and
wherein a connection portion between the end portion of the group of first phase terminals and the output terminal of the first power module, and a connection portion between the end portion of the group of second phase terminals and the output terminal of the second power module are point-symmetric with respect to the axial center of the output shaft as viewed from a non-output side of the output shaft in the axial direction.

3. The electric power steering device according to claim 1, wherein the first control board and the second control board, and the first power module and the second power module are each point-symmetric with respect to the axial center of the output shaft as viewed from a non-output side of the output shaft in the axial direction.

4. The electric power steering device according to claim 1,
wherein the mounting portions, on which the first control board and the first power module are to be mounted, are provided adjacent to each other in a circumferential direction,
wherein a protruding amount from the mounting portion of the first control board toward the first power module side is larger than a protruding amount from the mounting portion of the first control board toward an opposite side to the first power module,
wherein the mounting portions, on which the second control board and the second power module are to be mounted, are provided adjacent to each other in the circumferential direction, and
wherein a protruding amount from the mounting portion of the second control board toward the second power module is larger than a protruding amount from the mounting portion of the second control board toward an opposite side to the second power module.

5. The electric power steering device according to claim 1,
wherein the column portion has a rectangular shape in which one end portion in a length direction of a long side protrudes toward one end in a length direction of a short side, and another end portion in the length direction of the long side protrudes toward another end in the length direction of the short side, as viewed from a non-output side of the output shaft in the axial direction, wherein the first control board is mounted on a mounting portion defined by the long side on one end side of the short side of the rectangular shape so as to protrude toward another end portion in the length direction of the long side, wherein the first power module is mounted on a mounting portion defined by a short side on another end side in the length direction of the long side while being shifted toward another end side in the length direction of the short side, wherein the second control board is mounted on a mounting portion defined by a long side on another end side of the short side of the rectangular shape so as to protrude toward one end in a length direction of the long side, and wherein the second power module is mounted on a mounting portion defined by a short side on one end side in the length direction of the long side while being shifted toward one end side in the length direction of the short side.

6. The electric power steering device according to claim 1, wherein a recess is formed in the heat sink so as to open to the motor side, wherein a sensor rotor is mounted to a non-output side end portion of the output shaft, and wherein a rotation sensor is provided in the recess so as to face the sensor rotor.

7. The electric power steering device according to claim 6, wherein at least one set of connectors configured to input and output power and a signal to and from the outside is provided at a non-output side end portion of the housing, wherein the first control board and the second control board each have a flat rectangular plate shape, and are each mounted on a target mounting portion out of the mounting portions with a longitudinal direction of each long side of the flat rectangular plate shape being set as the axial direction of the output shaft, wherein signal lines from the one set of connectors are connected to connection terminals formed at end portions of non-output side short sides of the first control board and the second control board, wherein signal lines from the rotation sensor are connected to connection terminals formed at end portions of output side short sides of the first control board and the second control board, wherein signal lines from the first power module are connected to connection terminals formed at an end portion of a long side on the first power module side, of the first control board, and wherein signal lines from the second power module are connected to connection terminals formed at an end portion of a long side on the second power module side, of the second control board.

8. The electric power steering device according to claim 1, wherein a first power supply connector and a first signal connector, and a second power supply connector and a second signal connector are provided at a non-output side end portion of the housing, the first power supply connector and the first signal connector being configured to input and output power and a signal between the first power module and the first control board, and the outside, and the second power supply connector and the second signal connector being configured to input and output power and a signal between the second power module and the second control board, and the outside, and wherein power supply lines from the first power supply connector and the second power supply connector, and signal lines from the first signal connector and the second signal connector are each point-symmetric with respect to the axial center of the output shaft as viewed from the non-output side of the output shaft in the axial direction.

9. The electric power steering device according to claim 1, wherein a first power supply connector and a first signal connector, and a second power supply connector and a second signal connector are provided at a non-output side end portion of the housing, the first power supply connector and the first signal connector being configured to input and output power and a signal between the first power module and the first control board, and the outside, and the second power supply connector and the second signal connector being configured to input and output power and a signal between the second power module and the second control board, and the outside, and wherein the first control board and the second control board, the first power module and the second power module, the first power supply connector and the second power supply connector, and the first signal connector and the second signal connector are each point-symmetric with respect to the axial center of the output shaft as viewed from the non-output side in the axial direction of the output shaft.

10. An electric power steering device, comprising:
a motor; and
a control unit provided in an axial direction of an output shaft of the motor to be integrated with the motor,
the motor including one set of motor windings,
the control unit including:
a first power module including a plurality of first switching elements configured to supply current to a predetermined phase winding that forms the one set of motor winding;
a first control board configured to output a control signal to each of the plurality of first switching elements;
a second power module including a plurality of second switching elements configured to supply current to remaining phase windings that form the one set of motor windings;
a second control board configured to output a control signal to each of the plurality of second switching elements;
a heat sink configured to release heat generated in the control unit; and
a housing forming an outer case of the control unit,
the heat sink including a column portion extending in the axial direction of the output shaft on an extension of an axial center of the output shaft in the housing,
the column portion having a plurality of mounting portions defined by flat surfaces parallel to the axial direction of the output shaft,
the first control board and the second control board being each mounted along a corresponding one of one pair of opposing mounting portions out of the plurality of mounting portions, the first power module and the second power module being each mounted along a corresponding one of another pair of opposing mounting portions out of the plurality of mounting portions.

* * * * *